United States Patent [19]

Crawford

[11] 4,259,780

[45] Apr. 7, 1981

[54] PARTS ASSEMBLER FOR BALLPOINT PENS

[75] Inventor: Lynn D. Crawford, San Jose, Calif.

[73] Assignees: Genevieve I. Hanscom; Genevieve I. Hanscom; Lois J. Thomson, both of San Jose, Calif.; Trustees of the Estate of Roy M. Magnuson, part interest to each

[21] Appl. No.: 28,000

[22] Filed: Apr. 9, 1979

[51] Int. Cl.³ .............................................. B23P 21/00

[52] U.S. Cl. ........................................ 29/808; 29/785; 198/392; 198/408

[58] Field of Search ................. 29/808, 785, 786, 792; 221/82; 198/392, 396, 397, 408

[56] References Cited

U.S. PATENT DOCUMENTS

| | | | |
|---|---|---|---|
| 3,295,659 | 1/1967 | Aidlin | 198/397 |
| 3,359,619 | 12/1967 | Walkden | 29/785 |
| 3,374,605 | 3/1968 | Satchwell et al. | 29/785 |
| 3,538,583 | 11/1970 | Galockin et al. | 29/785 |
| 3,551,993 | 1/1971 | Cassai et al. | 29/785 |
| 3,581,378 | 6/1971 | Jozens | 29/808 |
| 3,683,483 | 8/1972 | Klettke | 29/785 |
| 3,759,365 | 9/1973 | Aronson | 198/400 |
| 3,948,386 | 4/1976 | Nalbach | 198/400 |

*Primary Examiner*—Daniel C. Crane
*Attorney, Agent, or Firm*—Gerald L. Moore

[57] ABSTRACT

This invention relates to a machine which receives ballpoint pen barrel assemblies in bulk form, feeds these barrel assemblies in single-file order and orients them over a preassembled refill, spring and cap assembly which is carried along a predetermined path.

6 Claims, 12 Drawing Figures

PARTS ASSEMBLER FOR BALLPOINT PENS

BACKGROUND OF THE INVENTION

In the manufacture of many types of ballpoint pens and the like, it is necessary to assemble a multitude of relatively small and irregularly shaped parts that must be oriented relative to each other and fixed together in a final operation by screwing the barrel assembly into the cap assembly to hold the refill and spring assembly therebetween. To accomplish this procedure, the barrel assembly must be oriented and thereafter placed over the refill and spring assembly held in the inverted cap assembly. The predominant manner in which this procedure has been accomplished in the past is by hand alignment and placement of the barrel assembly onto the cap assembly. The present invention receives the barrel assemblies in bulk form, automatically orients and feeds these assemblies in single-file order and thereafter places them over the cap refill and spring assembly.

SUMMARY OF THE INVENTION

Apparatus for placing a barrel assembly onto a cap assembly including the ink refill assembly and spring, which apparatus comprises a bin for receiving the barrel assemblies in bulk form, means for feeding the barrel assemblies in single-file order from the bin to an orientation apparatus which causes them to drop in a predetermined attitude to a conveyance. The conveyance carries the barrel assemblies over a conveyor holding the inverted cap assemblies with the refill assemblies and springs therein. The barrel assemblies are dropped over the upstanding end of the refill assembly holding the spring and caused to ride down over the spring to a position to allow screwing into the cap assembly during the final assembly of the pen.

DESCRIPTION OF THE INVENTION

Figure 1:
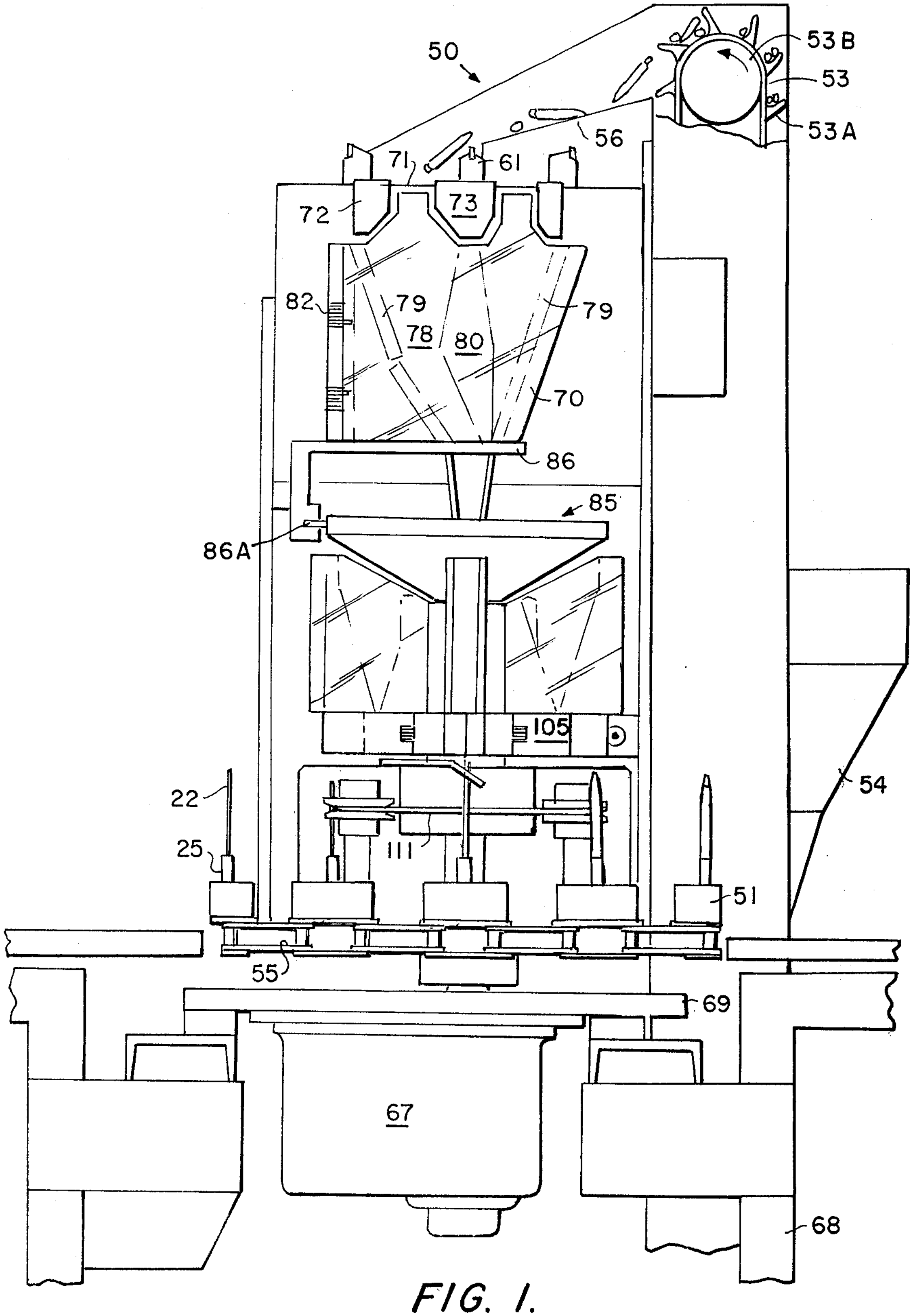
FIG. 1 is a side view of the apparatus incorporating the invention for orienting and placement of the barrel assemblies.
Figure 2:
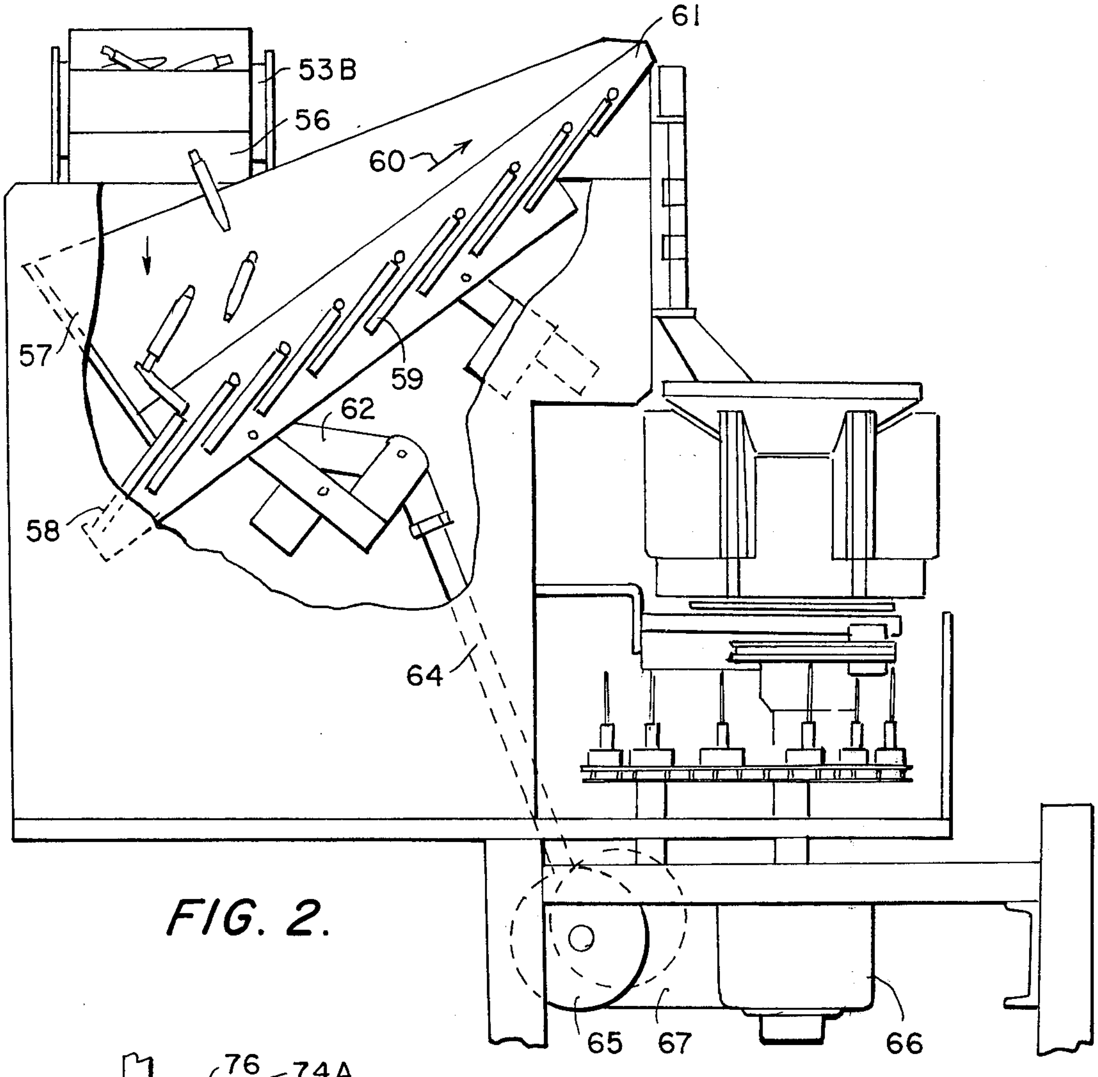
FIG. 2 is a side elevation view, partially cut away, of the barrel assembly feeder and carrousel.
Figure 3:
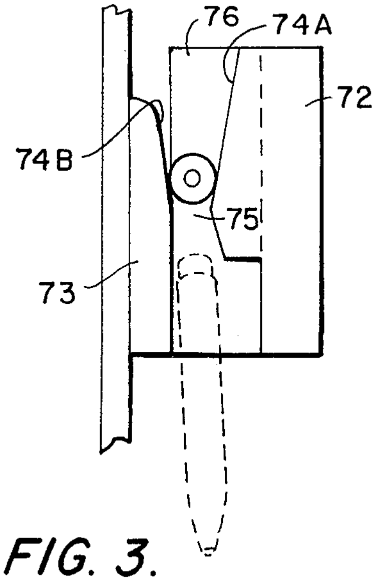
FIG. 3 is an enlarged side view of the barrel assembly orienter.
Figure 1A:
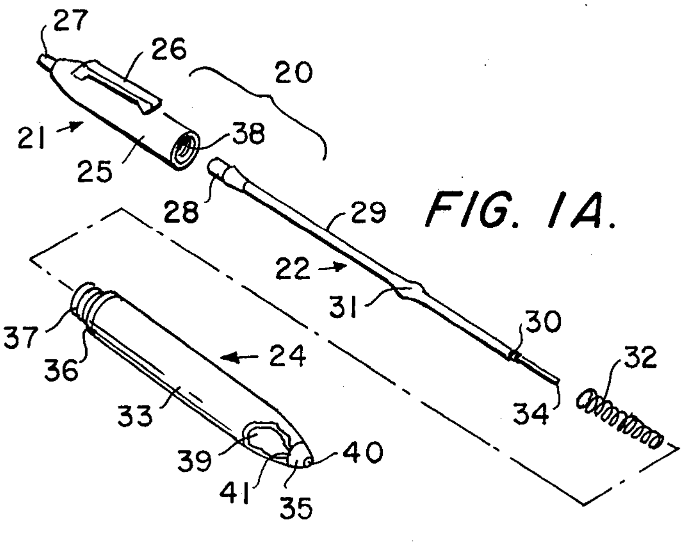
FIG. 1A is an exploded view showing the basic assemblies of a standard ballpoint pen.
Figure 4:
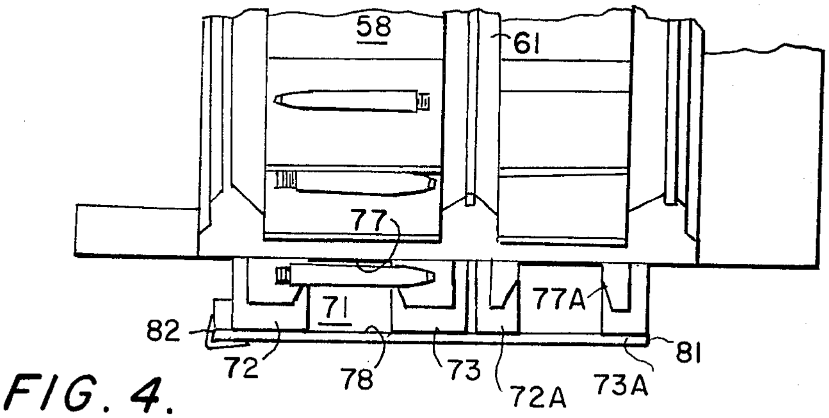
FIG. 4 is a top view of the barrel assembly orienter.

Shown in FIG. 1A in partially exploded view is a ballpoint pen 20 comprising a cap assembly 21, a refill assembly 22 and a barrel assembly 24. The cap assembly comprises a cap body 25, a clip 26 and a retractor pin 27. The refill assembly comprises a sealing cap 28 and cartridge 29, usually made of metal or plastic, and a writing tip 30. The refill assembly is slightly enlarged in the area 31 such that a spring 32, when placed over the writing tip, will abut the projection 31 and serve to springload the refill assembly in the retracted position so the tip 30 will be pulled into the barrel 24. The refill assembly includes ink which is fed to a writing surface by a ball tip 34.

The barrel assembly 24 comprises a barrel 33, a metal tip 35 and a metal ring 36 with the end opposite the metal tip being of a slightly smaller diameter and including the screw threads 37. The screw threads 37 interfit with internal threads 38 on the inside surface of the open end of the cap body and serve to hold the barrel and cap assemblies together. The barrel tapers to a continuing smaller diameter from the ring 36 adjacent the externally threaded end down to and including the tip 35. The barrel includes a center opening 39 extending the length thereof and communicating directly with the smaller diameter center opening 40 in the tip 35. The tip 35 forms an internal lip 41 against which the spring 32 abuts.

The pen is assembled by fitting the spring 32 over the writing tip 30 of the refill assembly until one end abuts the projection 31. The refill assembly and spring are inserted into the cap assembly with the sealing tip 28 abutting the retractor pin 27. Thereafter the barrel assembly 24 is placed over the writing tip 30 and the spring 32 until the spring abuts the lip 41 of the tip. With sufficient force to compress the spring 32, the writing cap 24 will be caused to abut the cap assembly 21 and the threaded end 37 will fit into the threaded recess 38 of the cap assembly. Thereafter by relative rotation of the cap and barrel assemblies these components can be threaded together to effect final assembly of the pen. By pressing the retractor pin 27, the writing tip 30 is caused to pass through the center opening 41 of the barrel assembly to the writing position. The next pressing of the retractor will allow the spring 32 to force the refill assembly back into the barrel to the nonwriting or retracted position. To assure there is little play between the writing tip of the refill assembly, the spring 32 and the cap assembly, the center opening 41 in the tip 35 is formed only slightly larger than the writing tip 30 of the refill cartridge and the spring 32. Thus care must be taken during assembly of the pen to assure that the tip is properly inserted into the barrel assembly prior to the exertion of a downward force to screw the cap and barrel assemblies together.

The apparatus 50 shown in the FIGS. 1 through 11 functions to receive the barrel assemblies 24 in bulk form, orient and feed each barrel assembly in single file and properly insert each over a corresponding cap, refill and spring assembly. A holder 51 is provided having a center opening 52 for receiving the inverted cap assembly. As shown primarily in FIG. 6 the center opening 52 includes a pair of oppositely extending slots 54 for receiving the clip 26 and holding the cap assembly against turning. The holders 52 are mounted on a power-driven conveyor chain 55 forming means for moving each cap and refill assembly along a predetermined path through the apparatus 50.

The barrel assemblies are fed to the machine by a feed belt 53 having a plurality of holders 53A thereon which, when the belt passes down into a bin 54 in which the barrel assemblies are placed in bulk form, pick up a quantity of the assemblies and carry them upward over a roller 53B for deposit on an inclined slide 56 to drop into a hopper 57 (FIG. 2), the bottom of which is a shuffle feeder 58. The shuffle feeder comprises a plurality of flights 59 which advance the barrel assemblies upward and forward in the direction of the arrow 60 in single file order. In the embodiment shown, the shuffle feeder has dual paths to accommodate different sizes of barrels, with one path always being blocked off to allow barrels to enter only the single path designed for barrel assemblies in the bin at that time. The blocking means is merely a planar member removably positioned at the entrance to the shuffle feeder and is not shown. The divider 61 separates the two feed paths.

The supporting and drive linkage 62 for the shuffle feeder is actuated by a drive rod 64 driven from an eccentric 65 and a gearbox 67 which derives power from the chain 55 providing the motive force for the apparatus 50 in a manner to be described later. Legs 68 support an upper platform 69 to which is fastened the apparatus 50. A more complete description of a suitable shuffle feed structure can be obtained by reference to U.S. Pat. Ser. No. 2,792,929 issued on May 21, 1957, and entitled: Shuffle Feed Structure. A level control (not shown) can be provided within the bin 57 for controlling the rate of feed of the conveyor 53 to assure against overfilling the hopper 57.

Figure 5:
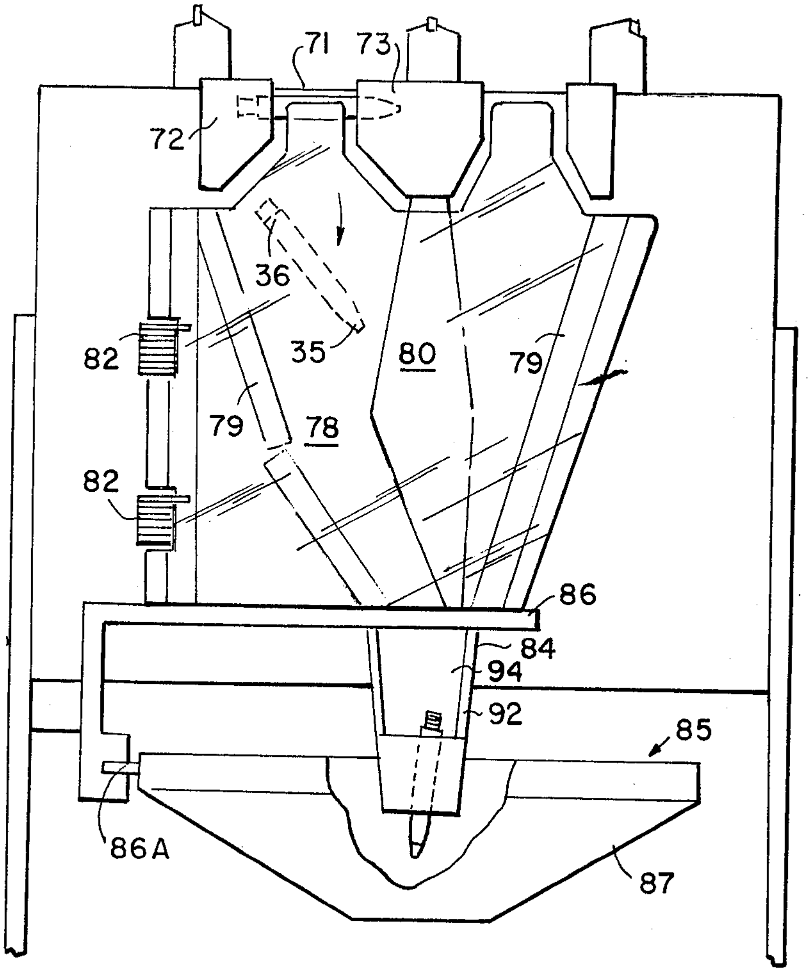
FIG. 5 is a side view of the barrel assembly orienter and feed means for the carrousel.

For orienting the barrel assemblies so that all are fed forward pointing the same way, there is provided the chute 70 (FIG. 2) comprising means for aligning the barrel assemblies. As shown primarily in FIGS. 1, 2 and 3, the barrel assemblies drop from the shuffle feeder 58 into a passage 71 formed between an outer wall member 72 and an inner wall member 73. This diverging passage 71 will allow passage of the barrel in one vertical orientation only. To each side of the passage 71 are the wall members 74A and 74B forming a diverging channel having a neck area 75 through which the tip end 35 of the barrel assembly will pass but the threaded end will not pass. Thus the tip end of the assembly always drops down first as shown in FIG. 5 and the ring end 36 is always delayed. After the tip end 35 pivots vertically downward the barrel is pivoted so that the threaded end enters the central passage 76 which is formed by the wall members 77 and 78 which do not diverge (shown in FIG. 4). The barrel then enters the chute 78 bordered by the wall members 79 and 80 and an outer cover 81 which preferably is transparent so as to allow the barrels to be viewed in case of any accidental jamming of the passageway. Preferably the outer transparent cover is supported by hinges 72 which allow the cover to be swung outward. The adjacent wall members 72A and 73A operate in the identical manner as those previously described except the dimensions of the throat 77A are changed to accommodate a different size of barrel assembly. The partition 80 can be pivoted to one side or the other to block one passage.

As shown in FIG. 5 the barrel assmblies fall into a single chute 84 oriented with the point downward. The chute terminates at a carrousel assembly 83 including a carrousel 85. The carrousel 85 is provided to initiate alignment of the now-oriented barrel assembly with the incoming holder 51 supporting a cap, refill and spring assembly in the inverted position as shown primarily in FIG. 9. A door 86 positioned at the bottom of the chute 78 is pivoted by a pin 86A on the carrousel to close between the dropping of each barrel assembly so as to prevent more than one assembly from dropping into a single position on the carrousel 85.

The carrousel 85 comprises a rotating dish-shaped upper member 87 which includes six upwardly-facing slots 88 therein. These slots are wider than the barrel assembly and include a sloped portion 89 (FIG. 6) which guides the barrel into the opening 90 extending through the dish 87. Beneath the dish 87 is a stationary plate 93 which supports the barrel assembly in the slots 88. The member 91 is positioned beneath the plate and is rotated with the dish member 87. The stationary plate 93 includes openings (not shown) through which the barrel assembly will drop at the predetermined position into a chute 92. The member 91 includes the chute 92 at the position it is desired for the barrel assembly to drop downward with the threaded end first. The chute 92 comprises side walls 93 and a ledge 94 which contacts and delays one end of the barrel assembly as it drops through the slot 90 aligning with the chute. The barrel assembly now is pivoted to drop with the tip end 35 contacting the inclined ledge 94 as the dish member 87 is rotated, driven by a center shaft 95 extending upward from the gearbox 67. The tip of the barrel assembly in contacting the ledge 94 pivots into the passage 92 with the threaded end downward such that the diverging walls 99 funnel it into a small center opening 100 through which it drops into a pocket 101 in a rotating member 102. This member 102 is connected to the member 91 and rotates therewith supported on the center shaft 95F. The cooperating gears 95A, 95B, the shaft 95C and the gears 95D and 95E are driven by the shaft 95F. The member 102 includes a plurality of block members 103 each forming a vertically extending opening 104 sized to receive one barrel assembly and allow it to slide downward. The trailing outer wall of the opening 104 is formed by a transparent door 105 which is supported by a springloaded hinge 106. Thus the barrel assembly is maintained in the vertical position with the downward end resting on a stationary plate 108.

Figure 6:
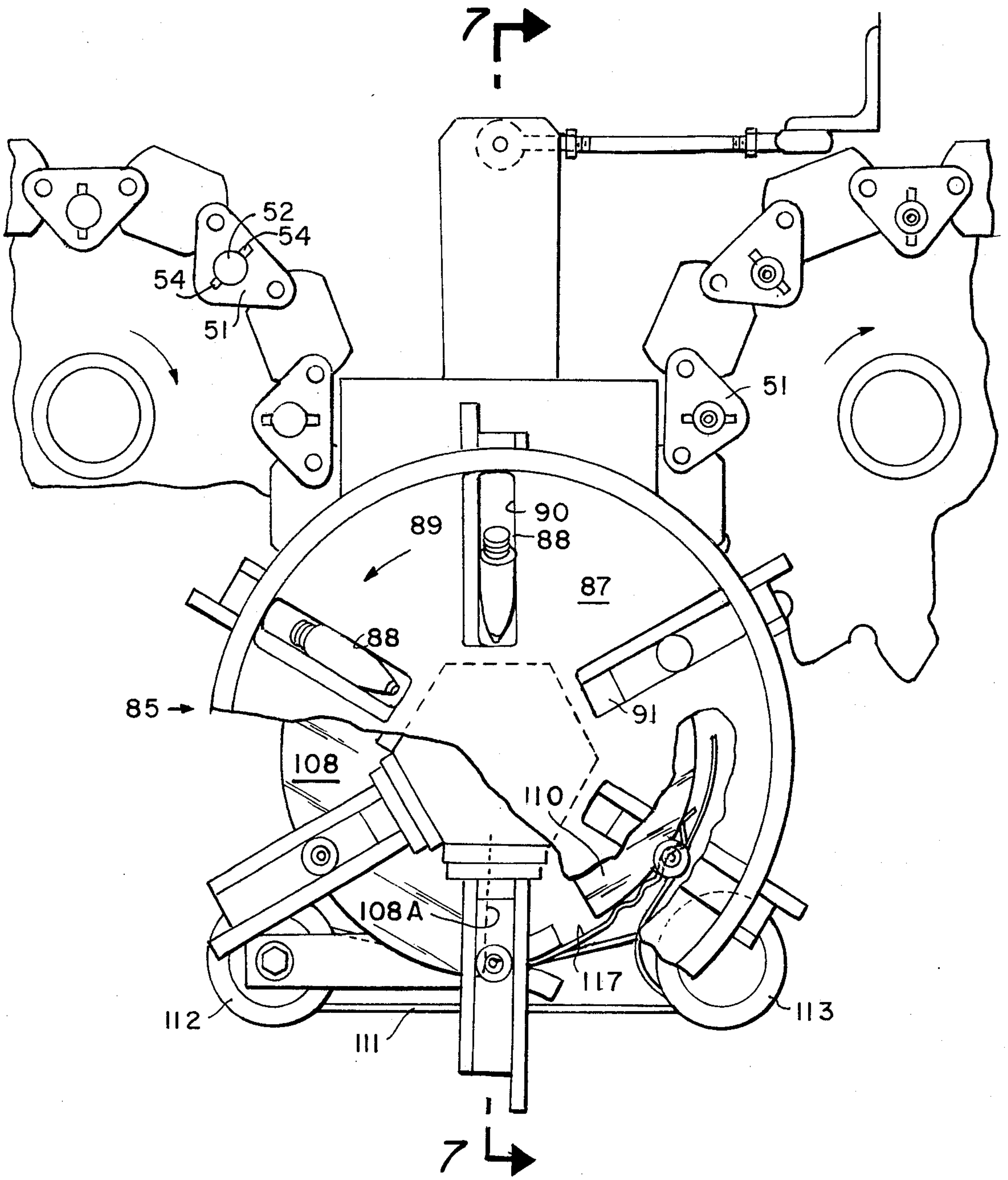
FIG. 6 is a top view of the carrousel partially cut away and showing the cap assembly conveyor.
Figure 7:
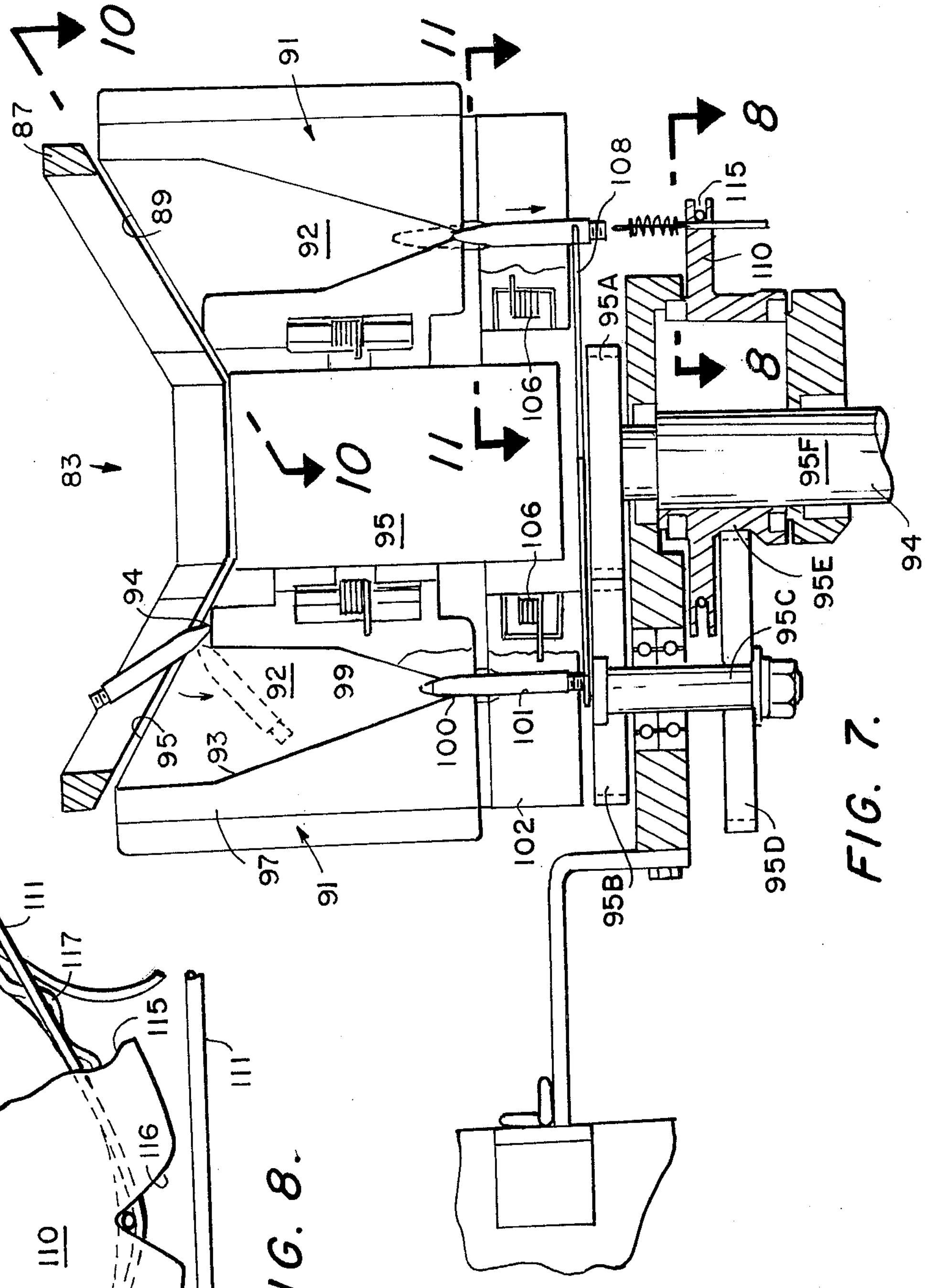
FIG. 7 is a cross-sectional view along the line 7—7 of FIG. 6.
Figure 8:
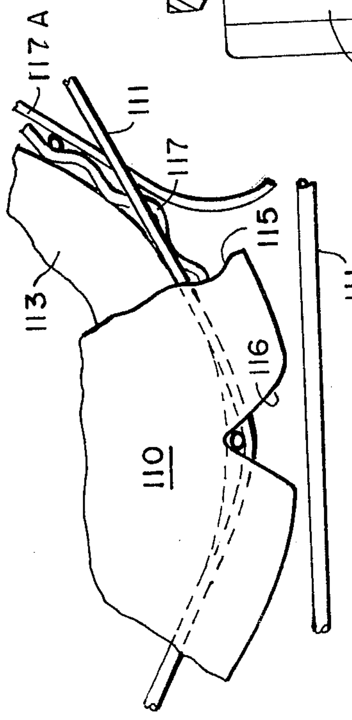
FIG. 8 is a cross-sectional view along the line 8—8 of FIG. 7.
Figure 9:
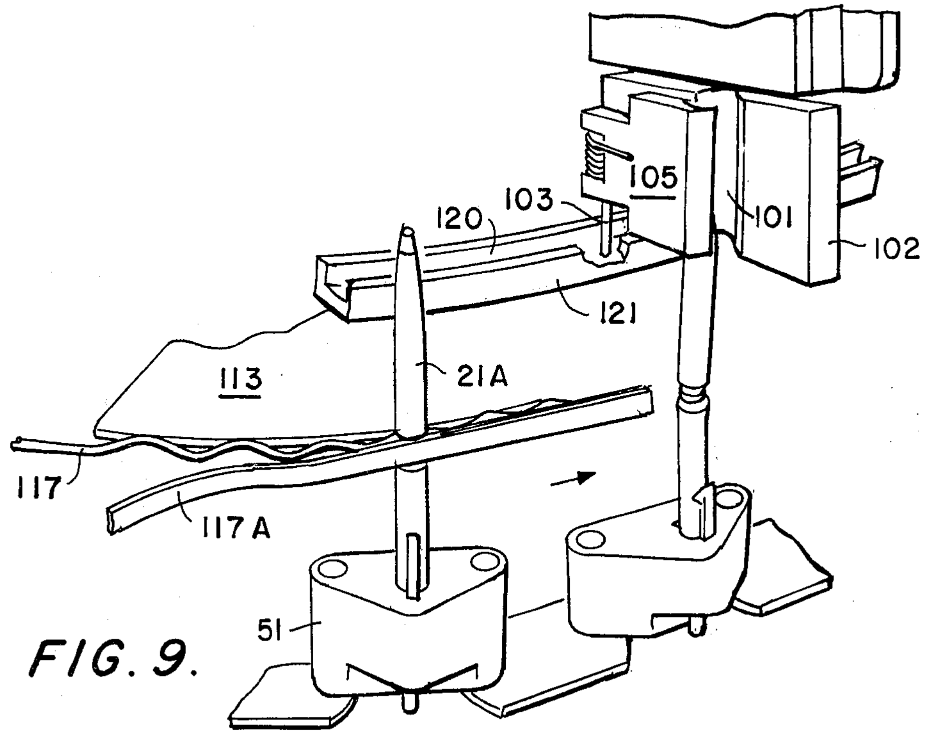
FIG. 9 is a perspective view of the barrel assembly placement device.
Figure 10:
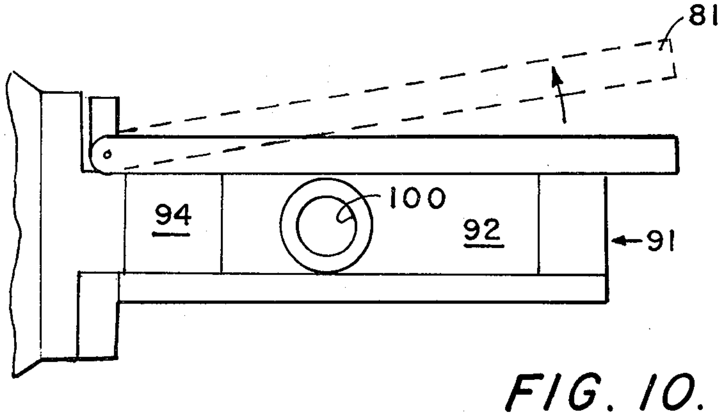
FIG. 10 is a cross-sectional view along the line 10—10 of FIG. 7.
Figure 11:
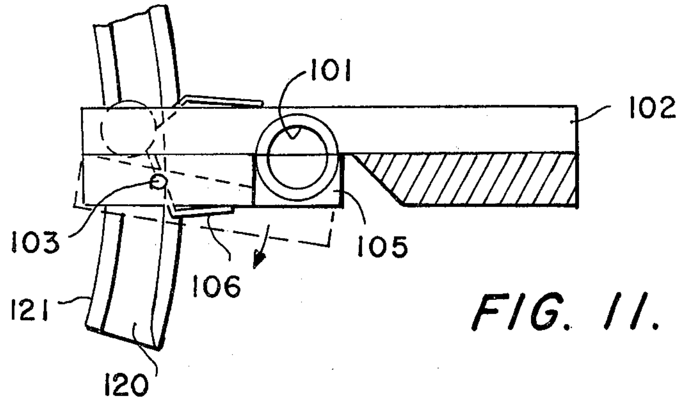
FIG. 11 is a cross-sectional view along the line 11—11 of FIG. 7.

The cap, refill and spring assembly supported in the holder 51 are moved at the same rotational speed as the member 102. At the time the barrel and cap assembly are in alignment, the barrel assembly clears a trailing edge 108A of the plate 108 and is allowed to drop vertically downward over the cap, refill and spring assembly to the position of the assembly 21A shown in FIG. 9. The supporting refill cartridge has been moved into contact with the periphery of a rotating member 110 driven at a faster speed by the gear 95D to move outward into contact with the refill cartridge which fits into a slot 116 and is held therein by a belt 111 supported between the pulleys 112 and 113 (FIG. 6). The positioning of the belt is such that the portion adjacent the carrousel fits into the adjacent slot 115 in the periphery of the member 110. The refill cartridge is held motionless against the bottom of a V-groove 116 (FIG. 8) in the rotating member 110 in a vertical attitude. After the barrel assembly is dropped thereover, the refill assembly is moved between a stationary plate 113 and a wave spring 117 and is shaken to assure that the barrel assembly slides downward over the combination refill assembly and the spring 32 carried thereon. Such action assures that each barrel assembly fits downward over the associated refill assembly and the spring into a position for threading of the barrel into the cap assembly. The wave spring is supported by a spring member 117A. Threading of the barrel into the cap takes place at a subsequent station not a part of this invention and therefore not shown in the drawings.

The combined cap, refill and spring assembly with the barrel assembly riding thereon is thereafter transported from the apparatus 50 by the chain conveyor 55. A pin 103 on the door 105 moves into a groove 120 in the arcuate member 121 and serves to pivot the door 105 open to assure that any barrel assembly which might happen to hang up in the pocket 101 will drop free and not reenter the barrel loading area. The cap, refill and spring assembly continues on the conveyor 55.

Thus as described, the barrel assemblies are received in bulk form, oriented and fed single file into a position of alignment with a cap, refill and spring assembly to thereafter be dropped thereover in preparation for the final assembly of the ballpoint pen.

The invention claimed:

1. Apparatus for assembling a ballpoint pen by placing a barrel assembly onto a cap assembly with inserted refill assembly and spring, wherein said barrel assembly has a larger diameter threaded end and a smaller diameter tip end, said apparatus comprising in combination:

means for receiving and transporting single-file along a predetermined path the cap assemblies with the open end extending vertically upward and the refill assembly and spring inserted therein to extend vertically upward and thereby form a cap, refill and spring assembly;

means for receiving a plurality of barrel assemblies;

means for transporting the barrel assemblies in single-file order;

means for aligning the barrel assemblies with the larger diameter threaded end extending vertically downward including a vertical passage including restrictions at each end only permitting passage of the smaller diameter tip end and means for dropping the barrel assemblies in a horizontal attitude into the vertical passage such that the smaller diameter tip will pass through the restriction and the larger diameter threaded end will be momentarily detained; and means for moving an aligned barrel assembly over the predetermined path and into alignment above a cap, refill and spring assembly including a rotating carrousel assembly positioned over the predetermined path of the cap, refill and spring assembly receiving and transporting means and having vertical pockets to hold each barrel assembly and wherein the bottom of said carrousel vertical pockets are formed by a stationary plate having a trailing edge which the barrel assembly moves across to be dropped onto the cap, refill and spring assembly thereby allowing the barrel assembly with the larger diameter threaded end extending vertically downwardly to drop downward over the cap, refill and spring assembly.

2. Apparatus as defined in claim 1 wherein one side of said carrousel pocket is formed by a door movable to allow the barrel assembly to be shifted out of the pocket if it fails to drop over the associated cap, refill and spring assembly at the trailing edge of said stationary plate.

3. Apparatus as defined in claim 2 wherein said carrousel moves the barrel assemblies at the same velocity the cap, refill and spring assemblies are moved by said receiving and transporting means to allow the carrousel to move the barrel assemblies into vertical alignment with the cap, refill and spring assemblies.

4. Apparatus as defined in claim 3 wherein said carrousel includes a rotating member having notches in the periphery aligning with the predetermined path of the cap, refill and spring assemblies to contact and hold each cap, refill and spring assembly stationary and vertical while the associated barrel assembly is dropped thereover.

5. Apparatus as defined in claim 4 wherein said carrousel assembly includes a driven belt positioned to contact and force the cap refill and spring assemblies into a notch of said rotating member.

6. Apparatus for assembling a ballpoint pen by placing a barrel assembly onto a cap assembly with inserted refill assembly and spring, wherein said barrel assembly has a larger diameter threaded end and a smaller diameter tip end, said apparatus comprising in combination:

means for receiving and transporting single-file along a predetermined path the cap assemblies with the open end extending vertically upward and the refill assembly and spring inserted therein to extend vertically upward and thereby form a cap, refill and spring assembly;

means for receiving a plurality of barrel assemblies;

means for transporting the barrel assemblies in single-file order;

means for aligning the barrel assemblies with the larger diameter threaded end extending vertically downward;

means for moving an aligned barrel assembly over the predetermined path and into alignment above a cap, refill and spring assembly;

means for releasing the barrel assembly at a predetermined time thereby allowing it to drop downward over the cap, refill and spring assembly; and means for shaking the cap, refill and spring assembly after the barrel assembly has dropped thereover to assure that the barrel assembly slides downward over the refill assembly and spring.

* * * * *